(12) United States Patent
Wang

(10) Patent No.: US 11,937,119 B2
(45) Date of Patent: Mar. 19, 2024

(54) METHOD AND TERMINAL FOR INITIATING TIME SENSITIVE COMMUNICATION SERVICE, AND STORAGE MEDIUM

(71) Applicant: TENCENT TECHNOLOGY (SHENZHEN) COMPANY LTD, Guangdong (CN)

(72) Inventor: Tao Wang, Shenzhen (CN)

(73) Assignee: TENCENT TECHNOLOGY (SHENZHEN) COMPANY LTD, Shenzhen (CN)

(*) Notice: Subject to any disclaimer, the term of this patent is extended or adjusted under 35 U.S.C. 154(b) by 219 days.

(21) Appl. No.: 17/499,054

(22) Filed: Oct. 12, 2021

(65) Prior Publication Data

US 2022/0030460 A1 Jan. 27, 2022

Related U.S. Application Data

(63) Continuation of application No. PCT/CN2020/115303, filed on Sep. 15, 2020.

(30) Foreign Application Priority Data

Sep. 27, 2019 (CN) .......................... 201910932087.9

(51) Int. Cl.
  *H04W 28/00* (2009.01)
  *H04L 47/28* (2022.01)
  *H04W 28/02* (2009.01)
  *H04W 72/20* (2023.01)

(52) U.S. Cl.
  CPC ......... *H04W 28/0268* (2013.01); *H04L 47/28* (2013.01); *H04W 72/20* (2023.01)

(58) Field of Classification Search
None
See application file for complete search history.

(56) References Cited

U.S. PATENT DOCUMENTS

2014/0086073 A1* 3/2014 Baykal ................ H04L 43/0894
                                                              370/252
2014/0109209 A1   4/2014 Haynes et al.

FOREIGN PATENT DOCUMENTS

| CN | 110072258 A    | 7/2019  |
| CN | 110636547 A    | 12/2019 |
| WO | 2019/166081 A1 | 9/2019  |

(Continued)

OTHER PUBLICATIONS

Huawei et al., "QoS Negotiation between 3GPP and TSN networks KI#3.1", SA WG2 Meeting #129, S2-1811021, Oct. 15-19, 2018, Dongguan, China (revision of S2-1811435) (9 pages total).

(Continued)

*Primary Examiner* — Gerald A Smarth

(74) *Attorney, Agent, or Firm* — Sughrue Mion, PLLC

(57) ABSTRACT

Embodiments of the disclosure provide a method and a terminal for initiating a time sensitive communication (TSC) service, and a storage medium. The terminal transmits request information for a TSC service to a network node, the request information including time parameters of the TSC service. The network node transmits response information including modified time parameters to the terminal, so that the terminal may perform the TSC service based on the response information, thereby implementing the TSC service initiated by the terminal.

20 Claims, 6 Drawing Sheets

(56) References Cited

FOREIGN PATENT DOCUMENTS

| WO | WO-2020106274 A1 * | 5/2020 | ......... H04L 65/1086 |
| WO | WO-2020221468 A1 * | 11/2020 | ............. H04L 41/12 |
| WO | WO-2021013338 A1 * | 1/2021 | ......... H04L 65/1069 |

OTHER PUBLICATIONS

Translation of Written Opinion of the International Searching Authority dated Dec. 17, 2020 in International Application No. PCT/CN2020/115303.

Office Action dated Jul. 21, 2022 in Chinese Application No. 201910932087.9.

Extended European Search Report dated Jun. 2, 2022, issued in European Application No. 20868000.9.

Nokia, Nokia Shanghai Bell, "TSN—QoS Framework Solution Update", ISA WG2 Meeting #129bis, Nov. 26-30, 2018, West Palm Beach, FL, S2-1811831, 7 pages.

Nokia, Nokia Shanghai Bell, "Introducing support for UE and UPF Residence Time for TSC Deterministic QoS", SA WG2 Meeting #132, Apr. 8-12, 2019, Xian, S2-1903654, 4 pages total.

Communication dated Jun. 22, 2022, issued in European Application No. 20868000.9.

Ericsson, "Support for IEEE 802.1Qbv scheduling", 3GPP TSG-SA WG2 Meeting #132 S2-1903378, Support for IEEE 802.1Qbv Scheduling, Apr. 8-12, 2019, pp. 1-6, Xi'an, China.

Office Action of Chinese Application No. 201910932087.9 dated Jul. 21, 2021.

International Search Report of PCT/CN2020/115303 dated Dec. 17, 2020 [PCT/ISA/210].

Written Opinion of PCT/CN2020/115303 dated Dec. 17, 2020 [PCT/ISA/237].

* cited by examiner

200

300

METHOD AND TERMINAL FOR INITIATING TIME SENSITIVE COMMUNICATION SERVICE, AND STORAGE MEDIUM

CROSS-REFERENCE TO RELATED APPLICATION(S)

This application is a continuation application of International Application No. PCT/CN2020/115303, filed Sep. 15, 2020, which claims priority to Chinese Patent Application No. 201910932087.9, filed with the China National Intellectual Property Administration on Sep. 27, 2019, the disclosures of which are incorporated by reference in their entireties.

FIELD

The disclosure relates to the field of wireless communications, and more specifically to a method and a terminal for initiating a time sensitive communication (TSC) service, and a related storage medium.

BACKGROUND

Compared with a conventional communication system, a core network architecture of a 5G communication system greatly changes. Specifically, a mobility management entity (MME) in a core network of the conventional communication system is replaced with a control plane function (CPF) entity. For example, functions of the MME are decomposed into an access and mobility management function (AMF) entity and a session management function (SMF) entity. In addition, a serving gateway (SGW) and a PDN gateway (PGW) in the core network of the conventional communication system are replaced with a user plane function (UPF) entity.

In addition, time sensitive communications (TSC) in time sensitive networking (TSN) is introduced into the 5G communication system, to support industrial automation and manufacturing applications that have relatively high time precision requirements. Specifically, the 5G communication system may be integrated into the TSN as an Ethernet bridge in the TSN. In this case, a terminal in the 5G communication system communicates with one or more devices in the TSN by using a device-side TSN translator (DS-TT). The UPF entity in the 5G communication system is connected to the TSN by a network-side TSN translator (NW-TT), and a TSN network side initiates a TSC service.

In addition, although the 5G communication system supports the terminal initiating a new service, the new service is a non-TSC service. In other words, in the related art, the 5G communication system does not support the terminal initiating a TSC service.

SUMMARY

To overcome deficiencies that exist in the prior art, example embodiments of the disclosure provide a method and a terminal for initiating a time sensitive communications (TSC) service, and a storage medium.

According to an aspect of the disclosure, a method for initiating a TSC service is provided, performed by a terminal, the method including: transmitting request information for a TSC service to a network node, the request information including time parameters of the TSC service; receiving response information from the network node, the response information including modified time parameters; and performing the TSC service based on the response information.

According to another aspect of the disclosure, a method for initiating a TSC service is provided, performed by a network node, the method including: receiving request information for a TSC service from a terminal, the request information including time parameters of the TSC service; transmitting the request information to a network controller; receiving response information from the network controller, the response information including modified time parameters; and transmitting, to the terminal, the response information based on which the TSC service is to be performed.

According to another aspect of the disclosure, a terminal for initiating a TSC service is provided, the terminal including at least one memory configured to store program code; and at least one processor configured to read the program code and operate as instructed by the program code, the program code including: transmission code configured to cause the at least one processor to transmit request information for a TSC service to a network node, the request information including time parameters of the TSC service; receiving code configured to cause the at least one processor to receive response information from the network node, the response information including modified time parameters; and processing code configured to cause the at least one processor to perform the TSC service based on the response information.

According to another aspect of the disclosure, a network node for initiating a TSC service is provided, the network node including at least one memory configured to store program code; and at least one processor configured to read the program code and operate as instructed by the program code, the program code including: receiving code configured to cause the at least one processor to receive request information for a TSC service from a terminal, the request information including time parameters of the TSC service; and transmission code configured to cause the at least one processor to transmit the request information to a network controller, the receiving code being further configured to cause the at least one processor to receive response information from the network controller, the response information including modified time parameters; the transmission code being further configured to cause the at least one processor to transmit the response information to the terminal.

According to another aspect of the disclosure, a terminal is provided, including a processor and a memory, the memory storing a computer program, the processor being configured to execute the computer program, to perform the method for initiating a TSC service based on the foregoing embodiments.

According to another aspect of the disclosure, a network node is provided, including a processor and a memory, the memory storing a computer program, the processor being configured to execute the computer program, to perform the method for initiating a TSC service according to the foregoing embodiments.

According to another aspect of the disclosure, a non-transitory computer-readable storage medium is provided, storing computer instructions, the computer instructions, when executed by one or more processors, causing the method for initiating a TSC service according to the foregoing embodiments to be performed.

BRIEF DESCRIPTION OF THE DRAWINGS

Through a more detailed description of example embodiments of the disclosure in combination with the accompanying drawings, the above and other objectives, features and advantages of the disclosure become more clear. The accompanying drawings are used to provide a further understanding of embodiments of the disclosure, constitute a part of this specification, and are used, together with the embodiments of the disclosure, to explain the disclosure, but do not constitute limitations to the disclosure. In the drawings, same reference numerals generally represent same components or operations.

DETAILED DESCRIPTION

Figure 1:
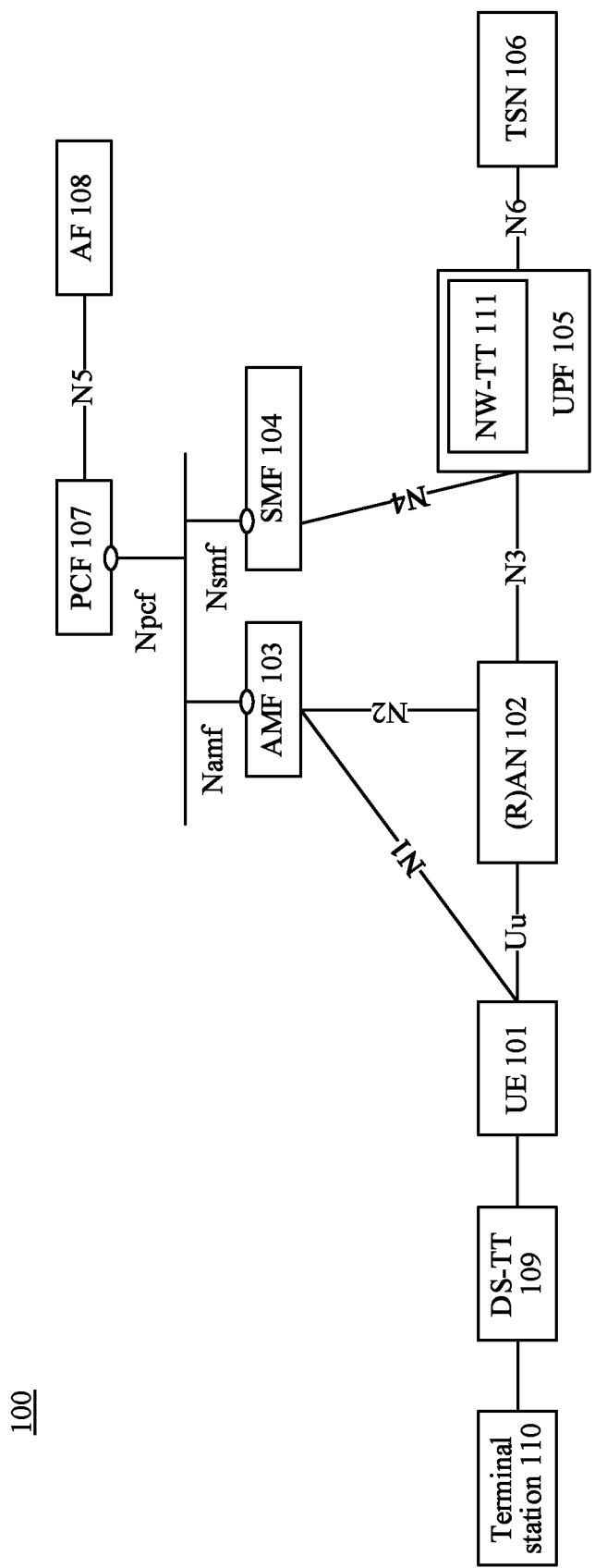
FIG. 1 is a schematic architectural diagram of a wireless time sensitive communications (TSC) system according to an example embodiment of the disclosure.

To make objectives, technical solutions and advantages of the disclosure more clear, example embodiments of the disclosure are described in detail below with reference to the accompanying drawings. In the accompanying drawings, same reference numerals represent same elements throughout. The embodiments described herein are merely illustrative and are not be construed as limiting the scope of the disclosure. In addition, terminals described herein may include various types of user terminals (user equipment, UE), such as mobile terminals or fixed terminals. For convenience, "UE" and "terminal" may be sometimes used interchangeably below.

FIG. 1 describes an architecture of a wireless time sensitive communications (TSC) system according to an example embodiment of the disclosure. The wireless TSC system may include a 5G system, or may include any other type of wireless communication system, for example, a 6G communication system. In the following, the embodiments of the disclosure are described by using the 5G system as an example. However, the following description may also be applied to other types of wireless communication systems. In addition, the wireless TSC system may further include time sensitive networking (TSN).

Specifically, as shown in FIG. 1, a wireless TSC system 100 includes UE 101, a (radio) access network ((R)AN) 102, an access and mobility management function (AMF) entity 103, a session management function (SMF) entity 104, a user plane function (UPF) entity 105, TSN 106, a policy control function (PCF) entity 107, an application function (AF) entity 108, a service translator 109 corresponding to the UE 101, a terminal station 110, a service translator 111 corresponding to the UPF entity 105, and the like.

In this embodiment of the disclosure, the (R)AN 102 may be an access network formed by base stations. The base station herein may be any type of a base station, such as a 5G base station or a base station in a conventional communication system. In addition, the AMF entity 103 may support access authentication, mobility management, registration management, connection management, lawful interception of the UE 101, and support transmission of session management information between the UE 101 and the SMF entity 104. The SMF entity 104 may support session management. The session management may include session establishment, modification, and release. The UPF entity 105 may have a routing function of a data packet, for example, may obtain a data packet from the TSN 106, and transmit the data packet to the (R)AN 102. The PCF entity 107 may support a unified policy framework to manage network behaviors and provide policy rules to control a control plane. The AF entity 108 may support an application influence on a service path, a mutual influence with a measurement framework for a policy control, and the like. The service translator 109 corresponding to the UE 101 may be a time sensitive service translator, for example, a device-side TSN translator (DS-TT). The DS-TT may support hold and forward functions for eliminating jitter, link layer connectivity discovery and reporting, and the like. The service translator 111 corresponding to the UPF entity 105 may alternatively be a time sensitive service translator, for example, a network-side TSN translator (NW-TT). The NW-TT is similar to the DS-TT, and may alternatively support hold and forward functions for eliminating jitter, link layer connectivity discovery and reporting, and the like.

In addition, the UE 101 may be connected to the (R)AN 102 by a Uu interface, and may be connected to the AMF entity 103 by an N1 interface. The (R)AN 102 may be connected to the AMF entity 103 by an N2 interface, and may be connected to a UPF entity 105 by an N3 interface. The UPF entity 105 may be connected to the SMF entity 104 by an N4 interface, and may be connected to the TSN 106 by an N6 interface. The SMF entity 104 may be connected to the PCF entity 107 by Nsmf and Npcf interfaces. The AMF entity 103 may be connected to the PCF entity 107 by Namf and Npcf interfaces. The PCF entity 107 may be connected to the AF entity 108 by an N5 interface. A 3GPP standard specification defines the interfaces mentioned herein, and therefore details are not described herein again. In addition, the UE 101 may communicate with the terminal station 110 by using the DS-TT, and the UPF entity 105 may communicate with the TSN 106 by using the NW-TT.

In addition, in an example of FIG. 1, the NW-TT is integrated in the UPF entity 105. However, the embodiments of the disclosure are not limited thereto. For example, the NW-TT and the UPF entity 105 may be two independent devices.

In addition, the entities described above may be one or more servers. In this embodiment of the disclosure, the "entity" may also be referred to as a node. For convenience, "entity" and "node" may be sometimes used interchangeably below.

In this embodiment of the disclosure, the terminal may transmit request information for a TSC service to a network node (for example, the AMF entity 103), and the request information may include time parameters of the TSC service. After receiving the request information, the network node may return response information to the terminal, and the response information may include modified time parameters, so that the terminal performs the TSC service according to the response information, thereby implementing the TSC service initiated by the terminal. In this embodiment of the disclosure, the TSC service may also be referred to as a TSN service.

Figure 2:
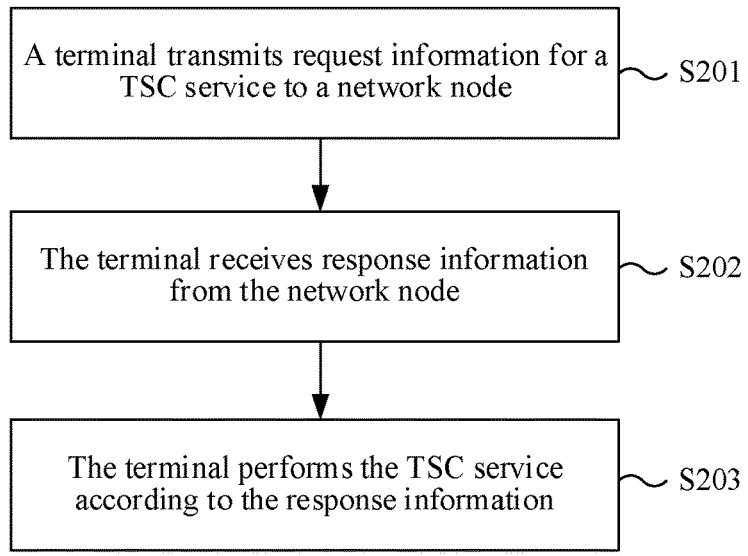
FIG. 2 is a flowchart of a method for initiating a TSC service according to an example embodiment of the disclosure.

FIG. 2 describes a method for initiating a TSC service according to an example embodiment of the disclosure. The method may be performed by a terminal. FIG. 2 is a flowchart of a method 200 for initiating a TSC service according to an example embodiment of the disclosure. As shown in FIG. 2, in operation S201, a terminal transmits request information for a TSC service to a network node.

In an example according to the disclosure, the request information in operation S201 may include first information and second information. The first information may be information about a time sensitive attribute of the TSC service. The second information may be requirement information of the TSC service for a quality of service (QoS) flow.

In this example, the first information may include time parameters of the TSC service. For example, the time parameters may include at least a start time of the TSC service, a transmission period of data in the TSC service, and a time precision requirement of the TSC service. The start time of the TSC service may be a time period. Alternatively, the start time of the TSC service may be a specific time point. The transmission period of the data in the TSC service may be a transmission or reception period of a data packet in the TSC service, for example, 5 ms. The time precision requirement of the TSC service may be a preset level, for example, a nanosecond level. In an example in which the start time of the TSC service is a time period and time precision is on a nanosecond level, the start time of the TSC service may be, for example, from the first nanosecond after 9:00 am to the first nanosecond after 9:10 am. In an example in which the start time of the TSC service is a specific time point and time precision is on a nanosecond level, the start time of the TSC service may be, for example, the first nanosecond after 9:00 am.

In this example, the first information may further include an identifier of the TSC service. The identifier of the TSC service may be used for identifying a service type of the TSC service. Alternatively, the identifier of the TSC service may be used for identifying a specific TSC service in a plurality of TSC services. Alternatively, the identifier of the TSC service may be used not only for identifying a service type of the TSC service, but also for identifying a specific TSC service in a plurality of TSC services. For example, the identifier of the TSC service may be an identification (ID) of the TSC service. In this example, a network side may identify the type of the service initiated by the terminal, and may also identify each TSC service initiated by the terminal, to determine a capability that the network side supports the service initiated by the terminal.

In this embodiment of the disclosure, the first information may also be referred to as requirement information of the TSC service. In this embodiment of the disclosure, the requirement information of the TSC service may be encapsulated in a specific format. For example, the specific format may be a TSC session requirement container. In this case, the TSC session requirement container may include the requirement information of the TSC service.

In this example, the second information may be used for describing configuration information of the QoS flow corresponding to the TSC service, for example, parameters such as a 5G QoS identifier (5QI), a guaranteed flow bit rate (GFBR), a maximum flow bit rate (MFBR), and a packet filter. The second information may be a requested QoS flow description defined in a 3GPP standard specification. After initiating the TSC service, the terminal may map, according to the second information, the service flow (which may be briefly referred to as a TSC service flow) corresponding to the TSC service to a QoS flow that has been established, or the terminal may establish a new QoS flow according to the second information and map the TSC service flow to the newly established QoS flow.

In another example according to the disclosure, the request information in operation S201 may further include third information. The third information may be information about a port that may support the TSC service in the service translator (for example, the DS-TT) corresponding to the terminal. The third information may include at least one of a port set, a port identifier (for example, a port number), information capacity that may be supported by a port, and a port delay (or port time) of the port that may support the TSC service in the service translator (for example, the DS-TT) corresponding to the terminal. The "port set" herein may include one or more ports.

In this embodiment of the disclosure, the third information may also be referred to as port management information provided by the terminal. In this embodiment of the disclosure, the port management information provided by the terminal may be encapsulated in a specific format. For example, the specific format may be a port management information container. In this case, the port management information container may include the port management information provided by the terminal.

In an embodiment, the requirement information of the TSC service, the requested QoS flow description, and the port management information described above may be transmitted to the network node after being encoded. Specifically, during encoding, the terminal may respectively encode the requirement information of the TSC service, the requested QoS flow description, and the port management information. This is because the terminals have different support capabilities for different services. For example, some terminals support both the TSC service and a non-TSC service, while some terminals support only the non-TSC service. Therefore, information (for example, the requirement information of the TSC service) related to the TSC service may be independently encoded. In this manner, the compatibility of the wireless TSC system with the terminals is improved, and the complexity of information processing is reduced.

In addition, in this embodiment of the disclosure, the terminal may transmit the requirement information of the TSC service, the requested QoS flow description, and the port management information described above to the network node by using one piece of signaling. In this manner, signaling interaction in the wireless TSC system may be reduced, signaling optimization in the wireless TSC system may be implemented, and signaling overheads may be reduced. The embodiments of the disclosure are not limited thereto. For example, the terminal may alternatively respectively transmit the requirement information of the TSC service, the requested QoS flow description, and the port management information described above to the network node by using a plurality of pieces of signaling. For example, the terminal may transmit the requirement information of the TSC service to the network node by using first signaling, transmit the requested QoS flow description to the network node by using second signaling, and transmit the port management information to the network node by using third signaling.

Returning to FIG. 2, in operation S202, the terminal receives response information from the network node.

In an example according to the disclosure, the response information in operation S202 may include modified time parameters. In an example in which the time parameters provided by the terminal include a start time of the TSC service, a transmission period of data in the TSC service, and a time precision requirement of the TSC service, the network side may modify one or more of the start time of the TSC service, the transmission period of the data in the TSC service, and the time precision requirement of the TSC service. Correspondingly, the modified time parameters may include one or more of the modified start time, the modified transmission period of the data, and the modified time precision.

For example, the network side may modify only the start time of the TSC service. In an example in which the start time of the TSC service in the time parameters provided by the terminal is a time period, the network side may specify a time point in the time period as the start time of the TSC service. Correspondingly, the modified time parameter may include a specified time point. When it is determined that the network side cannot recognize the TSC service according to the identifier of the TSC service, the network side may modify only the start time of the TSC service, but does not modify the transmission period of the data in the TSC service and the time precision requirement of the TSC service. For example, the network side may specify a time point in the time period as the start time of the TSC service. Correspondingly, the modified time parameter may include a specified time point. However, in an example in which the start time of the TSC service in the time parameters provided by the terminal is a specific time point, the network side may not modify the start time of the TSC service.

In another example, the network side may modify all of the start time of the TSC service, the transmission period of the data in the TSC service, and the time precision requirement of the TSC service. For example, when it is determined that the network side may recognize the TSC service according to the identifier of the TSC service, the network side may modify all of the start time of the TSC service, the transmission period of the data in the TSC service, and the time precision requirement of the TSC service.

Unmodified parameter(s) in the time parameters provided by the terminal may also be included in the modified time parameters. That is, when the network side does not modify at least one of parameters in the time parameters provided by the terminal, the modified time parameters may still include an original value of the at least one of parameters.

In another example according to the disclosure, the response information in operation S202 may further include information used for indicating a port used for performing the TSC service in the service translator (for example, the DS-TT) corresponding to the terminal. For example, the response information may include the port set and the port identifiers of ports used for performing the TSC service in the DS-TT corresponding to the terminal.

In this example, the port used for performing the TSC service in the DS-TT corresponding to the terminal may be determined at least according to the time parameters provided by the terminal. Specifically, the port used for performing the TSC service in the DS-TT corresponding to the terminal may be determined according to the time parameters and the port management information provided by the terminal. For example, a port set and identifiers of corresponding ports for performing the TSC service at the start time of the TSC service may be determined according to the start time of the TSC service in the time parameters and the port management information provided by the terminal, to determine the port used for performing the TSC service in the DS-TT corresponding to the terminal.

In this embodiment of the disclosure, the information used for indicating the port used for performing the TSC service in the service translator corresponding to the terminal may be referred to as TSC port management information, that is, the port management information provided by the network side. In this embodiment of the disclosure, the port management information provided by the network side may be encapsulated in a specific format. For example, the specific format may be the port management information container described above.

In another example according to the disclosure, the response information in operation S202 may further include TSC assistance information (TSCAI). The TSCAI may include one or more of information indicating a direction (for example, an uplink or a downlink) of the TSC service, the transmission period of the data in the TSC service, and an arrival time of the data in the TSC service.

In this example, the TSCAI may be generated according to the time parameters (that is, the modified time parameters) provided by the network side. For example, the arrival time of the data in the TSC service in the TSCAI may be determined according to the start time of the TSC service in the time parameters provided by the network side. In this example, the communication system may perform time-precision transmission control on the TSC service according to the TSCAI.

Returning to FIG. 2, in operation S203, the terminal performs the TSC service according to the response information. Specifically, the terminal may determine, according to the response information, a start time of the TSC service, a transmission period of data in the TSC service, and a time precision requirement of the TSC service that are determined by the network side, and perform the TSC service based on the start time of the TSC service, the transmission period of the data in the TSC service, and the time precision requirement of the TSC service.

By using the method for initiating a TSC service according to the example embodiments, the terminal may transmit request information for a TSC service to the network node, and the request information may include time parameters of the TSC service. After receiving the request information, the network node may return response information to the terminal, and the response information may include modified time parameter, so that the terminal performs the TSC service according to the response information, thereby implementing the TSC service initiated by the terminal.

Figure 3:
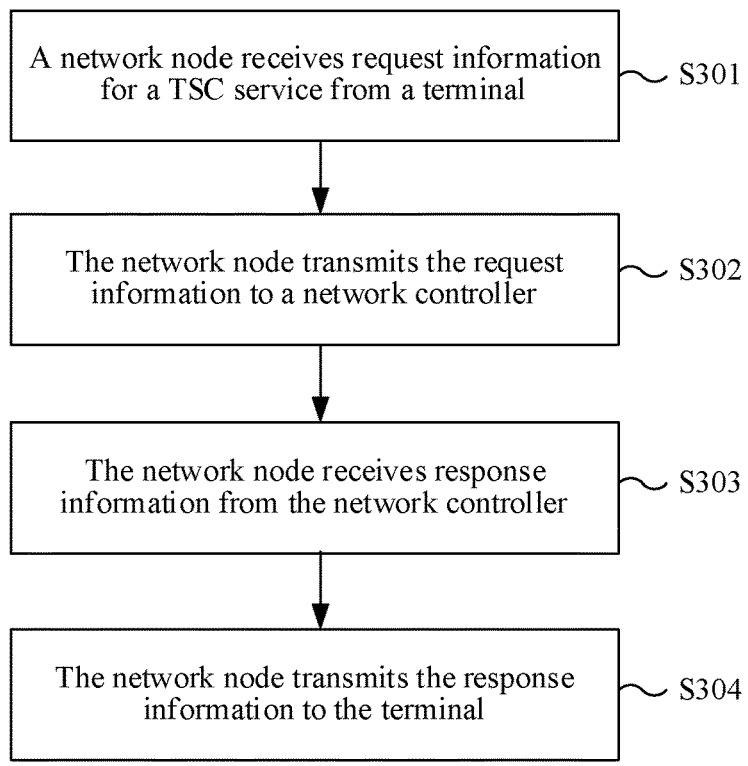
FIG. 3 is a flowchart of another method for initiating a TSC service according to an example embodiment of the disclosure.

FIG. 3 describes a method for initiating a TSC service according to an embodiment of the disclosure. The method may be performed by a network node. FIG. 3 is a flowchart of a method 300 for initiating a TSC service according to an embodiment of the disclosure. The network node herein may be the AMF entity 103 in FIG. 1. The operations performed according to the method 300 may be the same as or similar to details described above with reference to FIG. 2, and thus, repeated description of the same details is omitted.

As shown in FIG. 3, in operation S301, a network node receives request information for a TSC service from a terminal.

In an example according to the disclosure, the request information in operation S301 may include first information and second information. The first information may be information about a time sensitive attribute of the TSC service. The second information may be requirement information of the TSC service for a QoS flow.

In this example, the first information may include time parameters of the TSC service. For example, the time parameters may include at least a start time of the TSC service, a transmission period of data in the TSC service, and a time precision requirement of the TSC service. The start time of the TSC service may be a time period. Alternatively, the start time of the TSC service may be a specific time point. The transmission period of the data in the TSC service may be a transmission or reception period of a data packet in the TSC service, for example, 5 ms. The time precision requirement of the TSC service may be a preset level, for example, a nanosecond level. In an example in which the start time of the TSC service is a time period and time precision is on a nanosecond level, the start time of the TSC service may be, for example, from the first nanosecond after 9:00 am to the first nanosecond after 9:10 am. In an example in which the start time of the TSC service is a specific time point and time precision is on a nanosecond level, the start time of the TSC service may be, for example, the first nanosecond after 9:00 am.

In this example, the first information may further include an identifier of the TSC service. For example, the identifier of the TSC service may be an identification (ID) of the TSC service. In this example, a network side may identify the type of the service initiated by the terminal, and may also identify each TSC service initiated by the terminal, to determine a capability that the network side supports the service initiated by the terminal.

In this embodiment of the disclosure, the first information may also be referred to as requirement information of the TSC service. In this embodiment of the disclosure, the requirement information of the TSC service may be encapsulated in a specific format. For example, the specific format may be a TSC session requirement container. In this case, the TSC session requirement container may include the requirement information of the TSC service.

In this example, the second information may be used for describing configuration information of the QoS flow corresponding to the TSC service, for example, parameters such as a 5QI, a GFBR, an MFBR, and a packet filter.

In another example according to the disclosure, the request information in operation S301 may further include third information. The third information may be information about a port that may support the TSC service in the service translator (for example, the DS-TT) corresponding to the terminal. The third information may include at least one of a port set, a port identifier (for example, a port number), information capacity that may be supported by a port, and a port delay (or port time) of the port that may support the TSC service in the service translator (for example, the DS-TT) corresponding to the terminal.

In this embodiment of the disclosure, the third information may also be referred to as port management information provided by the terminal. In this embodiment of the disclosure, the port management information provided by the terminal may be encapsulated in a specific format. For example, the specific format may be a port management information container. In this case, the port management information container may include the port management information provided by the terminal.

After operation S301, the method 300 may include operation S302: transmitting, by the network node, the request information to a network controller. For example, the network node may transparently transmit the request information to the network controller. For example, the network node may transmit the request information to the network controller without making any modification to specific content of the request information.

Specifically, the network node may transparently transmit the request information to the SMF entity 104 in FIG. 1.

Then, the SMF entity 104 may transparently transmit the request information to the PCF entity 107 in FIG. 1. Then, the PCF entity 107 may transparently transmit the request information to the AF entity 108 in FIG. 1. Then, the AF entity 108 may transparently transmit the request information to the network controller.

In this embodiment of the disclosure, the network controller may be a time sensitive network controller. For example, the network controller may be a center network controller (CNC) in a TSN network. An IEEE standard specification defines the CNC mentioned herein, and therefore details are not described herein again.

After operation S302, the method 300 may include operation S303: receiving, by the network node, response information from the network controller. For example, the network controller may generate response information according to the received request information, and transmit the generated response information to the network node.

In an example according to the disclosure, the response information in operation S303 may include modified time parameters. In an example in which the time parameters provided by the terminal include a start time of the TSC service, a transmission period of data in the TSC service, and a time precision requirement of the TSC service, the network controller may modify one or more of the start time of the TSC service, the transmission period of the data in the TSC service, and the time precision requirement of the TSC service. Correspondingly, the modified time parameters may include one or more of the modified start time, the modified transmission period of the data, and the modified time precision.

For example, the network controller may modify only the start time of the TSC service. In an example in which the start time of the TSC service in the time parameters provided by the terminal is a time period, the network controller may specify a time point in the time period as the start time of the TSC service. Correspondingly, the modified time parameter may include a specified time point. When it is determined that the network controller cannot recognize the TSC service according to the identifier of the TSC service, the network controller may modify only the start time of the TSC service, but does not modify the transmission period of the data in the TSC service, and the time precision requirement of the TSC service. For example, the network controller may specify a time point in the time period as the start time of the TSC service. Correspondingly, the modified time parameter may include a specified time point. However, in an example in which the start time of the TSC service in the time parameters provided by the terminal is a specific time point, the network controller may not modify the start time of the TSC service.

In another example, the network controller may modify all of the start time of the TSC service, the transmission period of the data in the TSC service, and the time precision requirement of the TSC service. For example, when it is determined that the network controller may recognize the TSC service according to the identifier of the TSC service, the network controller may modify all of the start time of the TSC service, the transmission period of the data in the TSC service, and the time precision requirement of the TSC service.

In another example according to the disclosure, the response information in operation S303 may further include information used for indicating a port used for performing the TSC service in the service translator (for example, the DS-TT) corresponding to the terminal. For example, the response information may include the port set and the identifiers of ports used for performing the TSC service in the DS-TT corresponding to the terminal.

In this example, the network controller may determine, at least according to the time parameters provided by the terminal, the port used for performing the TSC service in the DS-TT corresponding to the terminal. Specifically, the network controller may determine, according to the time parameters and the port management information provided by the terminal, the port used for performing the TSC service in the DS-TT corresponding to the terminal. For example, the network controller may determine, according to the start time of the TSC service in the time parameters and the port management information provided by the terminal, a port set and identifiers of corresponding ports for performing the TSC service at the start time of the TSC service, to determine the port used for performing the TSC service in the DS-TT corresponding to the terminal.

In this embodiment of the disclosure, the information used for indicating the port used for performing the TSC service in the service translator corresponding to the terminal may be referred to as TSC port management information, that is, the port management information provided by the network controller.

In another example according to the disclosure, the response information in operation S303 may further include TSCAI. The TSCAI may include one or more of information indicating a direction (for example, an uplink or a downlink) of the TSC service, the transmission period of the data in the TSC service, and an arrival time of the data in the TSC service.

In this example, the network controller may generate the TSCAI according to the time parameters (that is, the modified time parameters) provided by the network controller. For example, the network controller may determine the arrival time of the data in the TSC service in the TSCAI according to the start time of the TSC service in the time parameters provided by the network controller. In this example, the communication system may perform time-precision transmission control on the TSC service according to the TSCAI.

In this embodiment of the disclosure, the network controller may transmit the modified time parameters, the TSC port management information, and the TSCAI described above to the network node by using one piece of signaling, and the network node may then transmit these information to UE and a DS-TT of the UE. In this manner, signaling interaction in the wireless TSC system may be reduced, signaling optimization in the wireless TSC system may be implemented, and signaling overheads may be reduced. In addition, in this manner, coordination between establishment of a QoS flow corresponding to a TSC service flow and port management may be implemented, thereby implementing high collaboration of a 5G network. The embodiments of the disclosure are not limited thereto. For example, the network controller may respectively transmit the modified time parameters, the TSC port management information, and the TSCAI described above to the network node by using a plurality of pieces of signaling, and the network node may then transmit these information to the UE and the DS-TT of the UE. For example, the network controller may transmit the modified time parameters to the network node by using fourth signaling, and the network node may then transmit these information to the UE and the DS-TT of the UE; the network controller may transmit the TSC port management information to the network node by using fifth signaling, and the network node may then transmit these information to the UE and the DS-TT of the UE; and the network controller may transmit the TSCAI to the network node by using sixth signaling, and the network node may then transmit these information to a next-generation radio access network (NG-RAN).

In operation S304, the network node transmits the response information to the terminal. Correspondingly, the terminal may perform the TSC service according to the received response information. Specifically, the terminal may determine, according to the response information, a start time of the TSC service, a transmission period of data in the TSC service, and a time precision requirement of the TSC service that are determined by the network side, and perform the TSC service based on the start time of the TSC service, the transmission period of the data in the TSC service, and the time precision requirement of the TSC service.

By using the method performed by the network node according to the embodiments, the network node may receive request information for a TSC service from the terminal, and the request information may include time parameters of the TSC service. After receiving the request information, the network node may return response information to the terminal, and the response information may include modified time parameters, so that the terminal performs the TSC service according to the response information, thereby implementing the TSC service initiated by the terminal.

Figure 4:
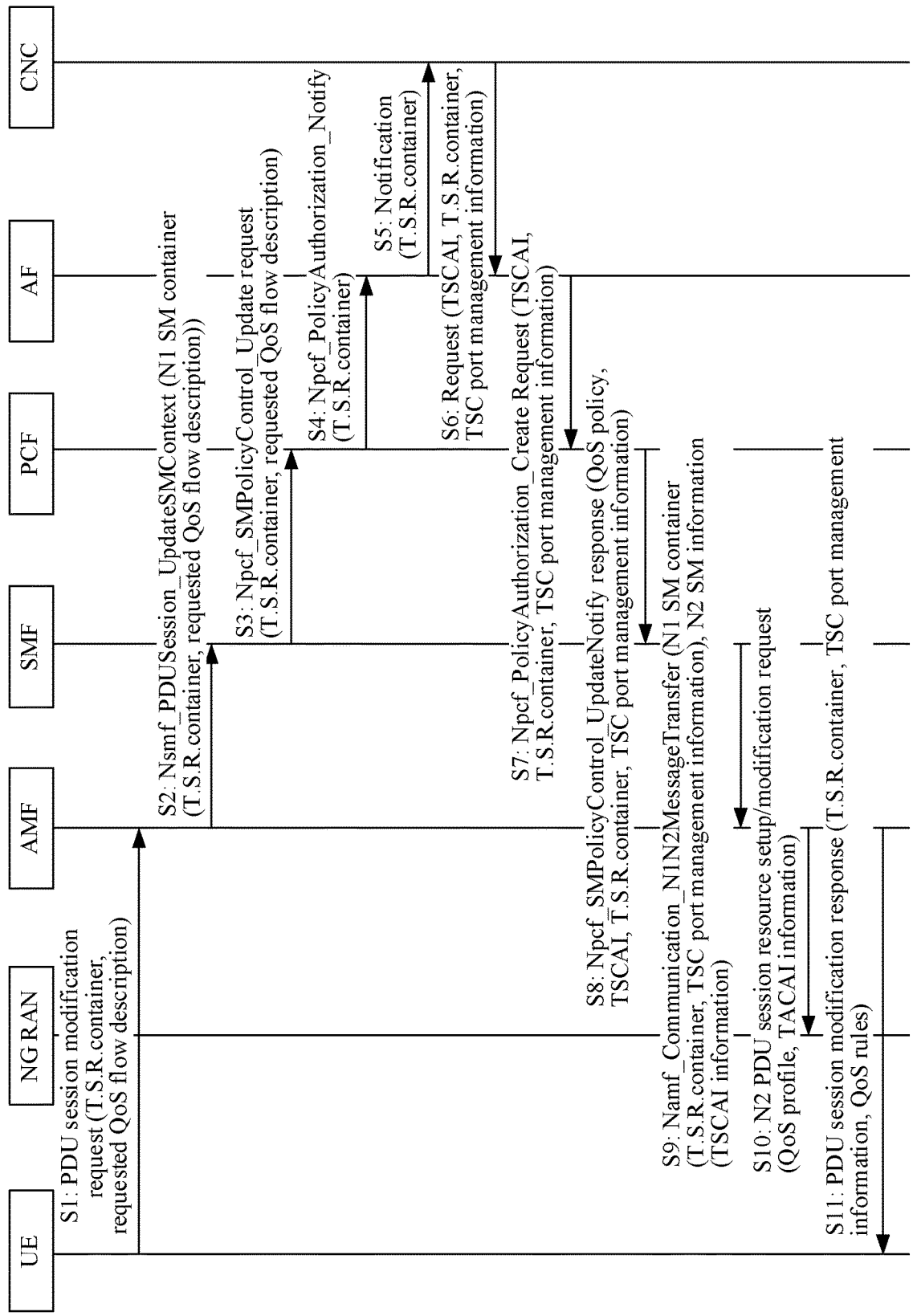
FIG. 4 is a schematic flowchart of a method for initiating a TSC service in a wireless TSC system according to an example embodiment of the disclosure.

An example method for initiating a TSC service in a wireless TSC system is described below with reference to FIG. 4. FIG. 4 is a schematic flowchart of a method for initiating a TSC service in a wireless TSC system according to an embodiment of the disclosure. An example shown in FIG. 4 is based on non-roaming of UE and a scenario in which a TSC service flow is mapped to a QoS flow that has been established.

As shown in FIG. 4, in operation S1, the UE may transmit a Protocol Data Unit (PDU) session modification request to an AMF. The PDU session modification request includes a TSC session requirement container (briefly referred to as a T.S.R.container in this procedure) and a requested QoS flow description.

Then, in operation S2, the AMF transmits PDU session_update SM content (Nsmf_PDUSession_UpdateSMContext) to an SMF by using an Nsmf interface. Nsmf_PDUSession_UpdateSMContext includes an N1 SM container. The N1 SM container includes the TSC session requirement container and the requested QoS flow description.

Then, in operation S3, the SMF transmits an SM policy control_update request (Npcf_SMPolicyControl_Update request) to a PCF by using an Npcf interface. The Npcf_SMPolicyControl_Update request includes the TSC session requirement container and the requested QoS flow description.

Then, in operation S4, the PCF transmits policy authorization notification (Npcf_PolicyAuthorization_Notify) to an AF. Npcf_PolicyAuthorization_Notify includes the TSC session requirement container.

Then, in operation S5, the AF notifies a CNC of the TSC session requirement container. The CNC may generate a modified TSC session requirement container, TSC port management information, and TSCAI according to the received information.

Then, in operation S6, the CNC transmits a request to the AF. The request includes the TSC session requirement container, the TSC port management information, and the TSCAI that are generated by the CNC.

Then, in operation S7, the AF transmits a policy authorization create request (Npcf_PolicyAuthorization Create Request) to the PCF by using an N5 interface. The Npcf_PolicyAuthorization Create Request includes the TSC session requirement container, the TSC port management information, and the TSCAI that are generated by the CNC.

In addition, the PCF may determine a QoS policy of the UE according to the "requested QoS flow description" in operation S3. In addition, in operation S8, the PCF transmits an SM policy control_update notification response (Npcf_SMPolicyControl_UpdateNotify response) to the SMF according to parameters such as a transaction ID of the AF in operation S7, and transmits the QoS policy, the TSC session requirement container, the TSC port management information, and the TSCAI to the SMF by using the Npcf_SMPolicyControl_UpdateNotify response.

Then, in operation S9, the SMF transmits communication message transfer (Namf_Communication_N1N2- MessageTransfer) to the AMF Namf_Communication_N1N2MessageTransfer includes an N1 SM container and N2 SM information. The N1 SM container includes the TSC session requirement container and the TSC port management information. The N2 SM information includes the TSCAI information. Specifically, the SMF may map the QoS policy to a QoS profile of the N2 SM, and add the QoS policy and the TSCAI information to the N2 SM information. In addition, the SMF may map the QoS policy to QoS Rules of the N1 SM, add the QoS policy, the TSC session requirement container, and the TSC port management information to the N1 SM container, and then transmit the QoS policy, the TSC session requirement container, and the TSC port management information to the AMF. The TSCAI provided by the CNC is based on a parameter value of an external TSN clock domain, and the SMF needs to convert the TSCAI into a parameter value of a clock domain of a 5G system. A 3GPP standard specification defines this conversion process, and therefore details are not described herein again.

Then, in operation S10, the AMF may transmit a PDU session resource setup/modification request (N2 PDU Session Resource Setup/Modification Request) to a 5G radio access network (RAN) (for example, a new radio RAN (NR RAN)) by using an N2 interface. The N2 PDU session resource setup/modification request includes QoS profile and the TACAI.

Then, in operation S11, the AMF transmits a PDU session modification response to the UE. The PDU session modification response includes the TSC session requirement container, the TSC port management information, and the QoS rules. Correspondingly, the UE may configure a TSC service flow according to the received information, to perform the TSC service.

In the foregoing operation S6 to operation S8, the TSC port management information provided by the CNC may include configuration information of a port in a DS-TT on a UE side and configuration information of a port in an NW-TT on a UPF side. However, the TSC port management information in the foregoing operation S9 and operation S11 may include only the configuration information of the port in the DS-TT on the UE side. For simplicity, the foregoing schematic diagram does not show a transmission process of the port in the NW-TT on the UPF side. In addition, the SMF may recognize the port in the DS-TT and the port in the NW-TT by using port numbers (for example, Ethernet media access control (MAC) addresses of the ports).

In addition, in the foregoing operations, both the TSC session requirement container and the parameters included in the TSC session requirement container are transparently transmitted from the UE to the AMF, from the AMF to the SMF, from the SMF to the PCF, from the PCF to the AF, and from the AF to the CNC.

Figure 5:
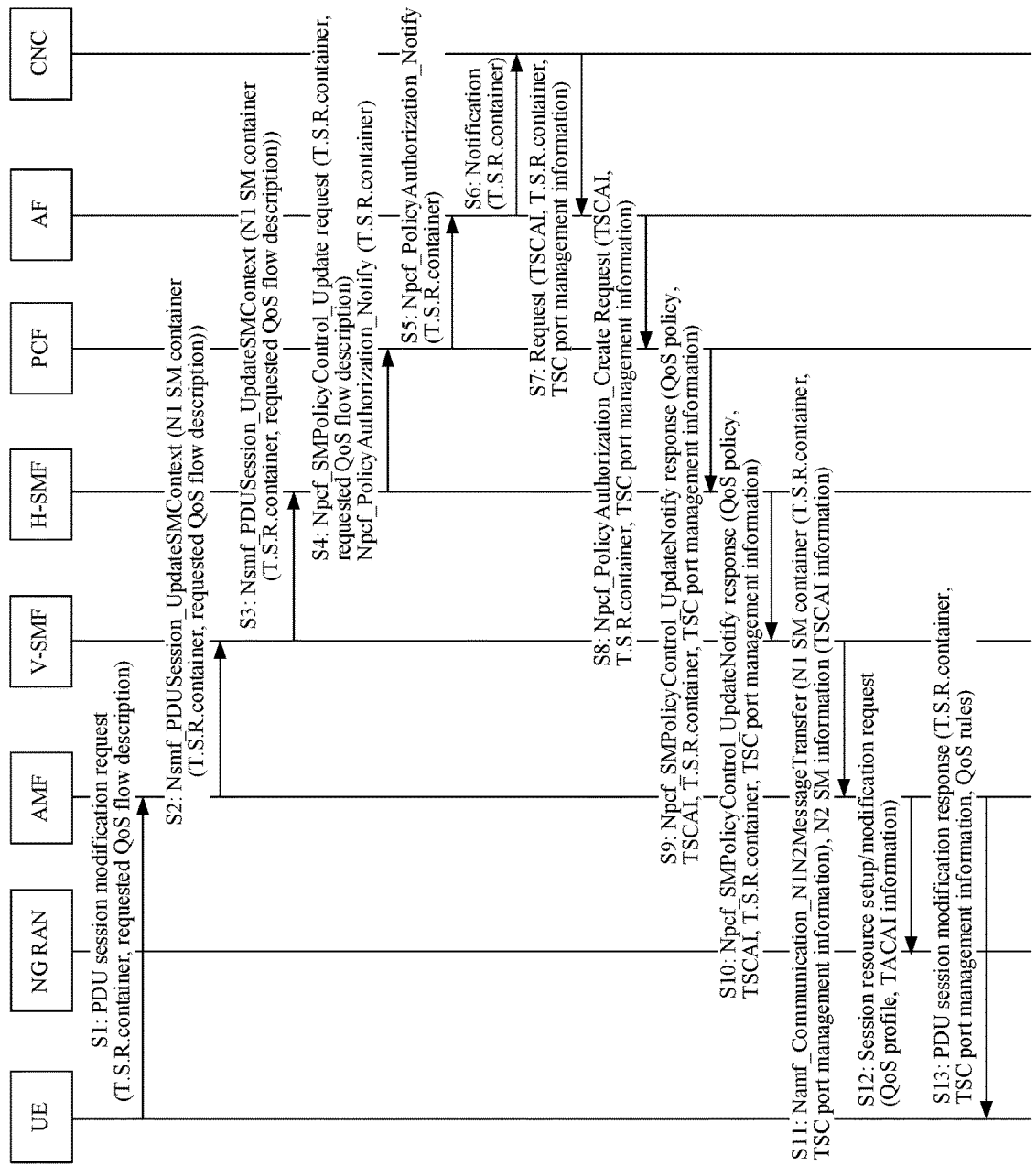
FIG. 5 is another schematic flowchart of a method for initiating a TSC service in a wireless TSC system according to an example embodiment of the disclosure.

Another example method for initiating a TSC service in a wireless TSC system is described below with reference to FIG. 5. FIG. 5 is a schematic flowchart of a method for initiating a TSC service in a wireless TSC system according to another example embodiment of the disclosure. An example shown in FIG. 5 is based on roaming of UE and a scenario in which a TSC service flow is mapped to a QoS flow that has been established.

As shown in FIG. 5, in operation S1, the UE may transmit a PDU session modification request to an AMF. The PDU session modification request includes a TSC session requirement container (briefly referred to as a T.S.R.container in this procedure) and a requested QoS flow description.

Then, in operation S2, the AMF transmits PDU session update SM content (Nsmf_PDUSession_UpdateSMContext) to a V-SMF (an SMF in a visited public land mobile network (VPLMN)) by using an Nsmf interface. Nsmf_PDUSession_UpdateSMContext includes the TSC session requirement container and the requested QoS flow description.

Then, in operation S3, the V-SMF transmits the PDU session update SM content (Nsmf_PDUSession_UpdateSMContext) to an H-SMF (an SMF in a home public land mobile network (HPLMN)) by using the Nsmf interface.

Nsmf_PDUSession_UpdateSMContext includes the TSC session requirement container and the requested QoS flow description.

Then, in operation S4, the H-SMF transmits an SM policy control_update request (Npcf_SMPolicyControl_Update request) to a PCF by using an Npcf interface. The Npcf_SMPolicyControl_Update request includes the TSC session requirement container and the requested QoS flow description.

Then, in operation S5, the PCF transmits a policy authorization notification (Npcf_PolicyAuthorization_Notify) to an AF. Npcf_PolicyAuthorization_Notify includes the TSC session requirement container.

Then, in operation S6, the AF notifies a CNC of the TSC session requirement container. The CNC may generate a modified TSC session requirement container, TSC port management information, and TSCAI according to the received information.

Then, in operation S7, the CNC transmits a request to the AF. The request includes the TSC session requirement container, the TSC port management information, and the TSCAI that are generated by the CNC.

Then, in operation S8, the AF transmits a policy authorization create request (Npcf_PolicyAuthorization_Create Request) to the PCF by using an N5 interface. The Npcf_PolicyAuthorization_Create Request includes the TSC session requirement container, the TSC port management information, and the TSCAI that are generated by the CNC.

In addition, the PCF may determine a QoS policy of the UE according to the "requested QoS flow description" in operation S4. In addition, in operation S9, the PCF transmits an SM policy control_update notification response (Npcf_SMPolicyControl_UpdateNotify response) to the H-SMF according to parameters such as a transaction ID of the AF in operation S8, and transmits the QoS policy, the TSC session requirement container, the TSC port management information, and the TSCAI to the H-SMF by using the Npcf_SMPolicyControl_UpdateNotify response.

Then, in operation S10, the H-SMF may transmit an SM policy control_update notification response (Npcf_SMPolicyControl_UpdateNotify response) to a V-SMF, and transmit the QoS policy, the TSC session requirement container, the TSC port management information, and the TSCAI to the V-SMF by using the Npcf_SMPolicyControl_UpdateNotify response.

Then, in operation S11, the V-SMF transmits communication message transfer (Namf_Communication_N1N2MessageTransfer) to the AMF. Namf_Communication_N1N2MessageTransfer includes an N1 SM container and N2 SM information. The N1 SM container includes the TSC session requirement container and the TSC port management information. The N2 SM information includes the TSCAI information. Specifically, the V-SMF may map the QoS policy to a QoS profile of the N2 SM, and add the QoS policy and the TSCAI information in the N2 SM information. In addition, the V-SMF may map the QoS policy to QoS Rules of the N1 SM, add the QoS policy, the TSC session requirement container, and the TSC port management information to an N1 SM container, and then transmits the QoS policy, the TSC session requirement container, and the TSC port management information to the AMF. The TSCAI provided by the CNC is based on a parameter value of an external TSN clock domain, and the H-SMF needs to convert the TSCAI into a parameter value of a clock domain of a 5G system. In this embodiment of the disclosure, the V-SMF and the H-SMF may be synchronized in time.

The embodiments of the disclosure are not limited thereto. For example, the V-SMF and the H-SMF may not be synchronized in time. For example, if the V-SMF and the H-SWF are in different time domains, the V-SMF may convert TSCAI based on a 5G clock domain in which the H-SMF is located into TSCAI based on a 5G clock domain in which the V-SMF is located. Specifically, if the V-SMF and the H-SMF are in different time domains, the V-SMF may convert a parameter value based on the 5G clock domain in which the H-SMF is located in the TSCAI into a parameter value based on the 5G clock domain in which the V-SMF is located. The parameter value may be, for example, an "arrival time of data in the TSC service" in the TSCAI. That is, the "arrival time of data in the TSC service" in the TSCAI received by the V-SMF from the H-SMF is based on the 5G clock domain in which the H-SMF is located, and the V-SMF may convert the "arrival time of data in the TSC service" into the parameter value based on the 5G clock domain in which the V-SMF is located.

Then, in operation S12, the AMF may transmit a PDU session resource setup/modification request (N2 PDU Session Resource Setup/Modification Request) to a 5G RAN (for example, an NR RAN) by using an N2 interface. The N2 PDU session resource setup/modification request includes QoS profile and the TACAI.

Then, in operation S13, the AMF transmits a PDU session modification response to the UE. The PDU session modification response includes the TSC session requirement container, the TSC port management information, and the QoS rules. Correspondingly, the UE may configure a TSC service flow according to the received information, to perform the TSC service.

In the foregoing operation S7 to operation S10, the TSC port management information provided by the CNC may include configuration information of a port in a DS-TT on a UE side and configuration information of a port in an NW-TT on a UPF side. However, the TSC port management information in the foregoing operation S11 and operation S13 may include only the configuration information of the port in the DS-TT on the UE side. For simplicity, the foregoing schematic diagram does not show a transmission process of the port in the NW-TT on the UPF side. In addition, the H-SMF may recognize the port in the DS-TT and the port in the NW-TT by using port numbers (for example, Ethernet MAC addresses of the ports), and the H-SMF may transmit the configuration information of the port in the DS-TT to the UE by using the V-SMF and the AMF, and transmit the configuration information of the port in the NW-TT to the H-UPF (a UPF in the HPLMN) by using an N4 interface.

In addition, in the foregoing operations, both the TSC session requirement container and the parameters included in the TSC session requirement container are transparently transmitted from the UE to the AMF, from the AMF to the V-SMF, from the V-SMF to the H-SMF, from the H-SMF to the PCF, from the PCF to the AF, and from the AF to the CNC.

Examples of the method for initiating a TSC service in the wireless TSC system in the scenario in which the TSC service flow is mapped to the QoS flow that has been established have been described above with reference to FIG. 4 and FIG. 5. However, the embodiments of the disclosure are not limited thereto. In a scenario in which a new session and a new QoS flow are established and the TSC service flow is mapped to the newly established QoS flow, the wireless TSC system may also implement the method for initiating a TSC service in the embodiments of the disclosure. Specifically, in this case, the specific procedure in which the wireless TSC system implements the method for initiating a TSC service in the embodiments of the disclosure is basically similar to that shown in FIG. 4 and FIG. 5. A main difference in the above case is as follows: in operation S1, the UE may transmit a PDU session establishment request to the AMF. The PDU session establishment request includes a TSC session requirement container (briefly referred to as a T.S.R.container in this procedure) and a requested QoS flow description. In this case, non-roaming of the UE (similar to that in FIG. 4) and roaming of the UE (similar to that in FIG. 5) states may also be supported.

Figure 6:
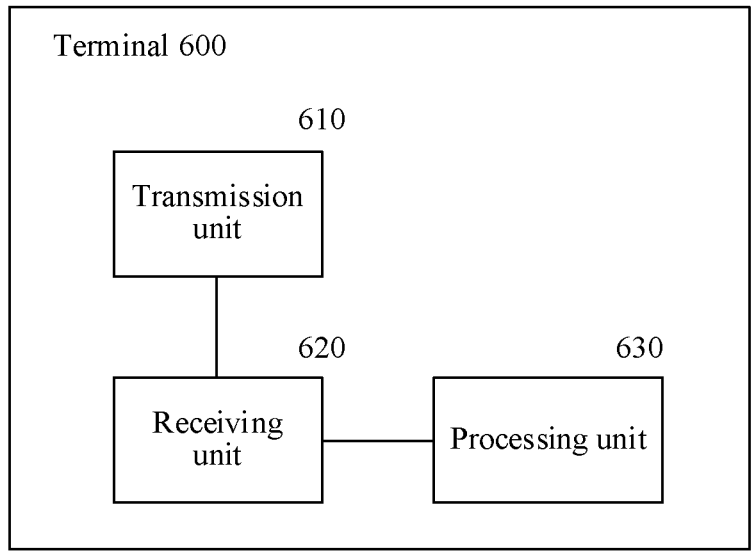
FIG. 6 is a schematic structural diagram of a terminal according to an example embodiment of the disclosure.

A terminal corresponding to the method for initiating a TSC service shown in FIG. 2 according to the embodiment of the disclosure is described below with reference to FIG. 6. FIG. 6 is a schematic structural diagram of a terminal 600 according to an embodiment of the disclosure. Because functions of the terminal 600 may include the same as functions of the terminal in the method described above with reference to FIG. 2, for simplicity, detailed description of same content is omitted. As shown in FIG. 6, the terminal 600 includes: a transmission unit 610, a receiving unit 620, and a processing unit 630. The transmission unit 610 is configured to transmit request information for a TSC service to a network node, the request information including time parameters of the TSC service. The receiving unit 620 is configured to receive response information from the network node, the response information including modified time parameters. The processing unit 630 is configured to perform the TSC service according to the response information. In addition to the above-described three units, the terminal 600 may further include other components. However, for the other components that are unrelated to the content of the embodiments of the disclosure, figures and description are omitted herein.

In an example according to the disclosure, the request information transmitted by the transmission unit 610 may include first information and second information. The first information may be information about a time sensitive attribute of the TSC service. The second information may be requirement information of the TSC service for a QoS flow.

In this example, the first information may include time parameters of the TSC service. For example, the time parameters may include at least a start time of the TSC service, a transmission period of data in the TSC service, and a time precision requirement of the TSC service. The start time of the TSC service may be a time period. Alternatively, the start time of the TSC service may be a specific time point. The transmission period of the data in the TSC service may be a transmission or reception period of a data packet in the TSC service, for example, 5 ms. The time precision requirement of the TSC service may be a preset level, for example, a nanosecond level. In an example in which the start time of the TSC service is a time period and time precision is on a nanosecond level, the start time of the TSC service may be, for example, from the first nanosecond after 9:00 am to the first nanosecond after 9:10 am. In an example in which the start time of the TSC service is a specific time point and time precision is on a nanosecond level, the start time of the TSC service may be, for example, the first nanosecond after 9:00 am.

In this example, the first information may further include an identifier of the TSC service. The identifier of the TSC service may be used for identifying a service type of the TSC service. Alternatively, the identifier of the TSC service may be used for identifying a specific TSC service in a plurality of TSC services. Alternatively, the identifier of the TSC service may not only be used for identifying a service type of the TSC service, but also may be used for identifying a specific TSC service in a plurality of TSC services. For example, the identifier of the TSC service may be an ID of the TSC service. In this example, a network side may identify the type of the service initiated by the terminal, and may also identify each TSC service initiated by the terminal, to determine a capability that the network side supports the service initiated by the terminal.

In this embodiment of the disclosure, the first information may also be referred to as requirement information of the TSC service. In this embodiment of the disclosure, the requirement information of the TSC service may be encapsulated in a specific format. For example, the specific format may be a TSC session requirement container. In this case, the TSC session requirement container may include the requirement information of the TSC service.

In this example, the second information may be used for describing configuration information of the QoS flow corresponding to the TSC service, for example, parameters such as a 5G QoS identifier (5QI), a guaranteed flow bit rate (GFBR), a maximum flow bit rate (MFBR), and a packet filter. The second information may be a requested QoS flow description defined in a 3GPP standard specification. After initiating the TSC service, the terminal may map, according to the second information, the service flow (which may be briefly referred to as a TSC service flow) corresponding to the TSC service to a QoS flow that has been established, or the terminal may establish a new QoS flow according to the second information and map the TSC service flow to the newly established QoS flow.

In another example according to the disclosure, the request information transmitted by the transmission unit 610 may further include third information. The third information may be information about a port that may support the TSC service in the service translator (for example, the DS-TT) corresponding to the terminal. The third information may include at least one of a port set, a port identifier (for example, a port number), information capacity that may be supported by a port, and a port delay (or port time) of the port that may support the TSC service in the service translator (for example, the DS-TT) corresponding to the terminal. The "port set" herein may include one or more ports.

In this embodiment of the disclosure, the third information may also be referred to as port management information provided by the terminal. In this embodiment of the disclosure, the port management information provided by the terminal may be encapsulated in a specific format. For example, the specific format may be a port management information container. In this case, the port management information container may include the port management information provided by the terminal.

In an embodiment, the transmission unit 610 may transmit the requirement information of the TSC service, the requested QoS flow description, and the port management information described above to the network node after being encoded. Specifically, during encoding, the transmission unit 610 may respectively encode the requirement information of the TSC service, the requested QoS flow description, and the port management information. This is because the terminals have different support capabilities for different services. For example, some terminals support both the TSC service and a non-TSC service, while some terminals support only the non-TSC service. Therefore, information (for example, the requirement information of the TSC service) related to the TSC service may be independently encoded. In this manner, the compatibility of the wireless TSC system with the terminals is improved, and the complexity of information processing is reduced.

In addition, in this embodiment of the disclosure, the transmission unit 610 may transmit the requirement information of the TSC service, the requested QoS flow description, and the port management information described above to the network node by using one piece of signaling. In this manner, signaling interaction in the wireless TSC system may be reduced, signaling optimization in the wireless TSC system may be implemented, and signaling overheads may be reduced. The embodiments of the disclosure are not limited thereto. For example, the transmission unit 610 may alternatively respectively transmit the requirement information of the TSC service, the requested QoS flow description, and the port management information described above to the network node by using a plurality of pieces of signaling. For example, the transmission unit 610 may transmit the requirement information of the TSC service to the network node by using first signaling, transmit the requested QoS flow description to the network node by using second signaling, and transmit the port management information to the network node by using third signaling.

In an example according to the disclosure, the response information received by the receiving unit 620 may include modified time parameters. In an example in which the time parameters provided by the terminal include a start time of the TSC service, a transmission period of data in the TSC service, and a time precision requirement of the TSC service, the network side may modify one or more of the start time of the TSC service, the transmission period of the data in the TSC service, and the time precision requirement of the TSC service. Correspondingly, the modified time parameters may include one or more of the modified start time, the modified transmission period of the data, and the modified time precision.

For example, the network side may modify only the start time of the TSC service. In an example in which the start time of the TSC service in the time parameters provided by the terminal is a time period, the network side may specify a time point in the time period as the start time of the TSC service. Correspondingly, the modified time parameter may include a specified time point. When it is determined that the network side cannot recognize the TSC service according to the identifier of the TSC service, the network side may modify only the start time of the TSC service, but does not modify the transmission period of the data in the TSC service and the time precision requirement of the TSC service. For example, the network side may specify a time point in the time period as the start time of the TSC service. Correspondingly, the modified time parameter may include a specified time point. However, in an example in which the start time of the TSC service in the time parameters provided by the terminal is a specific time point, the network side may not modify the start time of the TSC service.

In another example, the network side may modify all of the start time of the TSC service, the transmission period of the data in the TSC service, and the time precision requirement of the TSC service. For example, when it is determined that the network side may recognize the TSC service according to the identifier of the TSC service, the network side may modify all of the start time of the TSC service, the transmission period of the data in the TSC service, and the time precision requirement of the TSC service.

Unmodified parameters in the time parameters provided by the terminal may also be included in the modified time parameters. That is, when the network side does not modify some parameters in the time parameters provided by the terminal, the modified time parameters may still include original values of the parameters.

In another example according to the disclosure, the response information received by the receiving unit 620 may further include information used for indicating a port used for performing the TSC service in the service translator (for example, the DS-TT) corresponding to the terminal. For example, the response information may include the port set and the identifiers of ports used for performing the TSC service in the DS-TT corresponding to the terminal.

In this example, the port used for performing the TSC service in the DS-TT corresponding to the terminal may be determined at least according to the time parameters provided by the terminal. Specifically, the port used for performing the TSC service in the DS-TT corresponding to the terminal may be determined according to the time parameters and the port management information provided by the terminal. For example, a port set and identifiers of corresponding ports for performing the TSC service at the start time of the TSC service may be determined according to the start time of the TSC service in the time parameters and the port management information provided by the terminal, to determine the port used for performing the TSC service in the DS-TT corresponding to the terminal.

In this embodiment of the disclosure, the information used for indicating the port used for performing the TSC service in the service translator corresponding to the terminal may be referred to as TSC port management information, that is, the port management information provided by the network side.

In another example according to the disclosure, the response information received by the receiving unit 620 may further include TSCAI. The TSCAI may include one or more of information indicating a direction (for example, an uplink or a downlink) of the TSC service, the transmission period of the data in the TSC service, and an arrival time of the data in the TSC service.

In this example, the TSCAI may be generated according to the time parameters (that is, the modified time parameters) provided by the network side. For example, the arrival time of the data in the TSC service in the TSCAI may be determined according to the start time of the TSC service in the time parameters provided by the network side. In this example, the communication system may perform time-precision transmission control on the TSC service according to the TSCAI.

By using the terminal according to the embodiments, the terminal may transmit request information for a TSC service to the network node, and the request information may include time parameters of the TSC service. After receiving the request information, the network node may return response information to the terminal, and the response information may include at least one modified time parameter, so that the terminal performs the TSC service according to the response information, thereby implementing the TSC service initiated by the terminal.

Figure 7:
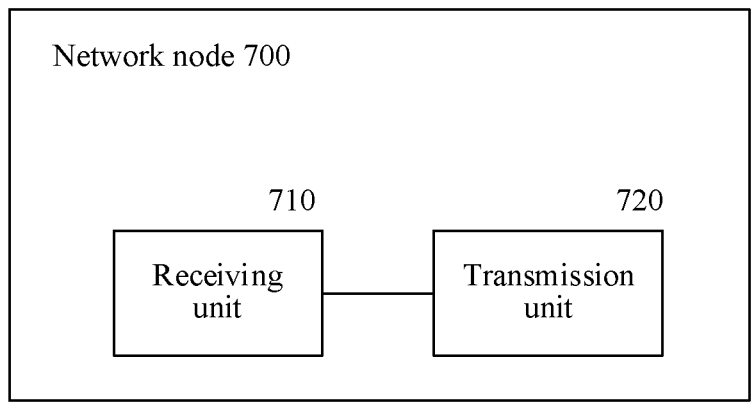
FIG. 7 is a schematic structural diagram of a network node according to an example embodiment of the disclosure.

A network node corresponding to the method for initiating a TSC service shown in FIG. 3 according to the embodiment of the disclosure is described below with reference to FIG. 7. FIG. 7 is a schematic structural diagram of a network node 700 according to an embodiment of the disclosure. Because functions of the network node 700 are the same as functions of the network node in the method described above with reference to FIG. 3, for simplicity, detailed description of same content is omitted. As shown in FIG. 7, the network node 700 includes a receiving unit 710 and a transmission unit 720. The receiving unit 710 is configured to receive request information for a TSC service from a terminal, the request information including time parameters of the TSC service. The transmission unit 720 is configured to transmit the request information to a network controller. The receiving unit 710 is further configured to receive response information from the network controller, the response information including modified time parameters. The transmission unit 720 is further configured to transmit the response information to the terminal. In addition to the two units, the network node 700 may further include other components. However, because the components are unrelated to the content of the embodiments of the disclosure, figures and description are omitted herein.

In an example according to the disclosure, the request information received by the receiving unit 710 may include first information and second information. The first information may be information about a time sensitive attribute of the TSC service. The second information may be requirement information of the TSC service for a QoS flow.

In another example according to the disclosure, the request information received by the receiving unit 710 may further include third information. The third information may be information about a port that may support the TSC service in the service translator (for example, the DS-TT) corresponding to the terminal. The third information may include at least one of a port set, a port identifier (for example, a port number), information capacity that may be supported by a port, and a port delay (or port time) of the port that may support the TSC service in the service translator (for example, the DS-TT) corresponding to the terminal. The "port set" herein may include one or more ports.

In this embodiment of the disclosure, the transmission unit 720 may transparently transmit the request information to the network controller. For example, the network node may transmit the request information to the network controller without making any modification to specific content of the request information.

Specifically, the transmission unit 720 may transparently transmit the request information to the SMF entity 104 in FIG. 1. Then, the SMF entity 104 may transparently transmit the request information to the PCF entity 107 in FIG. 1. Then, the PCF entity 107 may transparently transmit the request information to the AF entity 108 in FIG. 1. Then, the AF entity 108 may transparently transmit the request information to the network controller.

In this embodiment of the disclosure, the network controller may generate response information according to the received request information, and transmit the generated response information to the network node.

In an example according to the disclosure, the response information received by the receiving unit 710 may include modified time parameters. In an example in which the time parameters provided by the terminal include a start time of the TSC service, a transmission period of data in the TSC service, and a time precision requirement of the TSC service, the network controller may modify one or more of the start time of the TSC service, the transmission period of the data in the TSC service, and the time precision requirement of the TSC service. Correspondingly, the modified time parameters may include one or more of the modified start time, the modified transmission period of the data, and the modified time precision.

In another example according to the disclosure, the response information received by the receiving unit 710 may further include information used for indicating a port used for performing the TSC service in the service translator (for example, the DS-TT) corresponding to the terminal. For example, the response information may include the port set and the identifiers of ports used for performing the TSC service in the DS-TT corresponding to the terminal.

In this example, the network controller may determine, at least according to the time parameters provided by the terminal, the port used for performing the TSC service in the DS-TT corresponding to the terminal. Specifically, the network controller may determine, according to the time parameters and the port management information provided by the terminal, the port used for performing the TSC service in the DS-TT corresponding to the terminal. For example, the network controller may determine, according to the start time of the TSC service in the time parameters and the port management information provided by the terminal, a port set and identifiers of corresponding ports for performing the TSC service at the start time of the TSC service, to determine the port used for performing the TSC service in the DS-TT corresponding to the terminal.

In addition, in another example according to the disclosure, the response information received by the receiving unit 710 may further include TSCAI. The TSCAI may include one or more of information indicating a direction (for example, an uplink or a downlink) of the TSC service, the transmission period of the data in the TSC service, and an arrival time of the data in the TSC service.

In this example, the network controller may generate the TSCAI according to the time parameters (that is, the modified time parameters) provided by the network controller. For example, the network controller may determine the arrival time of the data in the TSC service in the TSCAI according to the start time of the TSC service in the time parameters provided by the network controller. In this example, the communication system may perform time-precision transmission control on the TSC service according to the TSCAI.

In this embodiment of the disclosure, the network controller may transmit the modified time parameters, the TSC port management information, and the TSCAI described above to the receiving unit 710 by using one piece of signaling, and the transmission unit 720 may then transmit these information to UE and a DS-TT of the UE. In this manner, signaling interaction in the wireless TSC system may be reduced, signaling optimization in the wireless TSC system may be implemented, and signaling overheads may be reduced. In addition, in this manner, coordination between establishment of a QoS flow corresponding to a TSC service flow and port management may be implemented, thereby implementing high collaboration of a 5G network. The embodiments of the disclosure are not limited thereto. For example, the network controller may respectively transmit the modified time parameters, the TSC port management information, and the TSCAI described above to the receiving unit 710 by using a plurality of pieces of signaling, and the transmission unit 720 may then transmit these information to the UE and the DS-TT of the UE. For example, the network controller may transmit the modified time parameters to the receiving unit 710 by using fourth signaling, and the transmission unit 720 may then transmit these information to the UE and the DS-TT of the UE; the network controller may transmit the TSC port management information to the receiving unit 710 by using fifth signaling, and the transmission unit 720 may then transmit these information to the UE and the DS-TT; and the network controller may transmit the TSCAI to the receiving unit 710 by using sixth signaling, and the transmission unit 720 may then transmit these information to an NG-RAN.

By using the network node according to the embodiments, the network node may receive request information for a TSC service from the terminal, and the request information may include time parameters of the TSC service. After receiving the request information, the network node may return response information to the terminal, and the response information may include modified time parameters, so that the terminal performs the TSC service according to the response information, thereby implementing the TSC service initiated by the terminal.

The embodiments of the disclosure provide a terminal, including a processor and a memory, the memory storing a computer program, the processor being configured to execute the computer program, to perform the method for initiating a TSC service according to the foregoing embodiments.

The embodiments of the disclosure provide a network node, including a processor and a memory, the memory storing a computer program, the processor being configured to execute the computer program, to perform the method for initiating a TSC service according to the foregoing embodiments.

Figure 8:
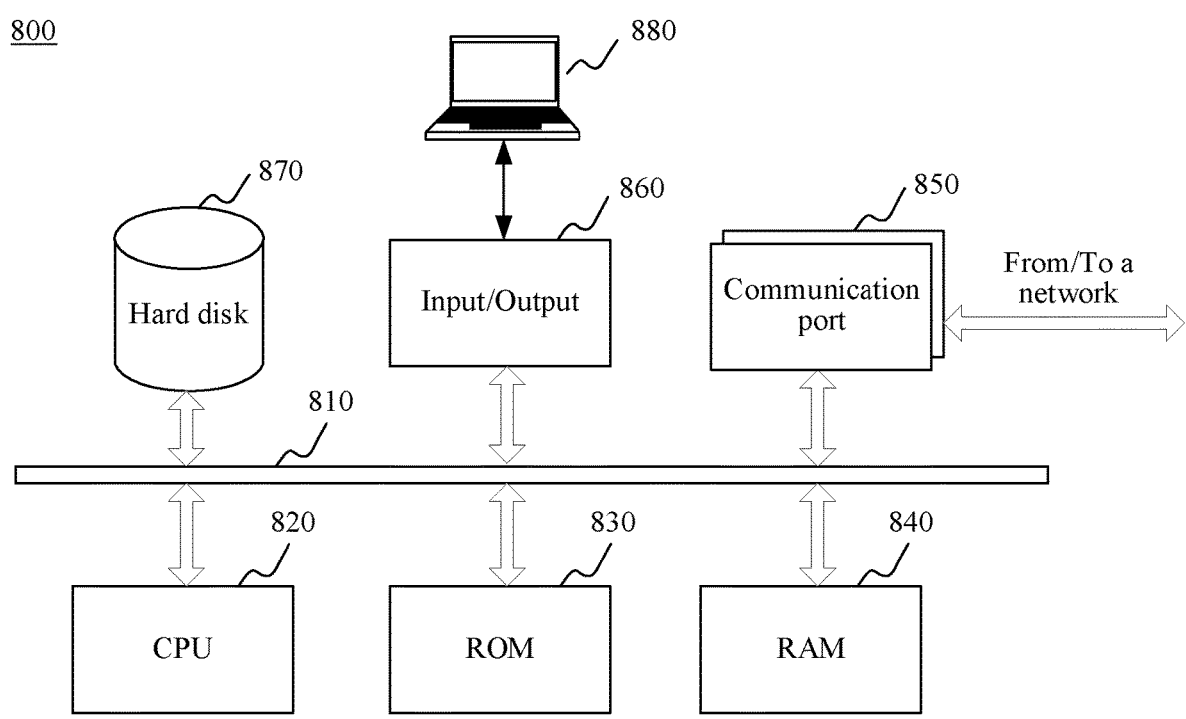
FIG. 8 is a schematic architectural diagram of a device according to an example embodiment of the disclosure.

In addition, the device (for example, the terminal or the network node) according to the embodiment of the disclosure may be implemented by using an architecture of a computing device shown in FIG. 8. FIG. 8 shows an architecture of the computing device. As shown in FIG. 8, the computing device 800 may include a bus 810, one or more CPUs 820, a read-only memory (ROM) 830, a random access memory (RAM) 840, a communication port 850 connected to a network, an input/output component 860, a hard disk 870, and the like. Storage devices, for example, the ROM 830 and the hard disk 870, in the computing device

800 may store various data or files used in processing and/or communication in a computer and program instructions executed by the CPU. The computing device 800 may further include a user interface 880. The architecture shown in FIG. 8 is merely an example, and when different devices are implemented, one or more components in the computing device shown in FIG. 8 may be omitted according to actual requirements.

The embodiments of the disclosure provide a computer program product or a computer program. The computer program product or the computer program includes computer instructions, and the computer instructions are stored in a computer-readable storage medium. A processor of a computer device reads the computer instructions from the computer-readable storage medium, and executes the computer instructions, so that the computer device performs the method for initiating a TSC service provided in the foregoing implementations.

In the method, terminal, network node for initiating a TSC service and a computer-readable storage medium according to the embodiments of the disclosure, the terminal may transmit request information for a TSC service to the network node, and the request information may include time parameters of the TSC service. After receiving the request information, the network node may return response information to the terminal, and the response information may include modified time parameter, so that the terminal performs the TSC service according to the response information, thereby implementing the TSC service initiated by the terminal.

The embodiments of the disclosure may alternatively be implemented as a computer-readable storage medium. Computer-readable instructions are stored on the computer-readable storage medium in the embodiments of the disclosure. The computer-readable instructions, when executed by one or more processors, cause the method in the embodiments of the disclosure described with reference to the foregoing accompanying drawings to be performed. The computer-readable storage medium includes, but is not limited to, a volatile memory and/or a non-volatile memory. For example, the volatile memory may include a RAM and/or a cache. For example, the non-volatile memory may include a ROM, a hard disk, and a flash memory.

A person skilled in the art would understand that, content disclosed in the embodiment of the disclosure may have various variations and improvements. For example, the devices or components described above may be implemented by using hardware, or may be implemented by using software, firmware, or a combination of some of or all of the software, the firmware, and the hardware.

In addition, as shown in the embodiment of the disclosure and the claims, words such as "a/an", "one", and/or "the" do not refer specifically to singular forms and may also include plural forms, unless the context expressly indicates an exception. The "first", the "second" and similar terms used in the embodiment of the disclosure do not indicate any order, quantity or significance, but are used to only distinguish different components. Similarly, a similar term such as "include" or "comprise" means that an element or an item appearing in front of the term covers an element or an item and equivalents thereof listed behind the term, but does not exclude another element or item. A similar term such as "connect" or "connection" is not limited to a physical or mechanical connection, but may include an electrical connection, whether direct or indirect.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

In addition, flowcharts are used in the embodiments of the disclosure for describing operations performed by the wireless TSC system in the embodiments of the disclosure. The foregoing or following operations are not necessarily precisely performed according to an order. On the contrary, the operations may be performed in a reverse order or simultaneously. In addition, other operations may be also added to the processes, or one or more operations may be removed from the processes.

Unless otherwise defined, all terms (including technical and scientific terms) used herein have the same meaning as commonly understood by one of ordinary skill in the art to which the disclosure belongs. The terms such as those defined in commonly used dictionaries are to be interpreted as having meanings that are consistent with the meanings in the context of the related art, and are not to be interpreted in an idealized or extremely formalized sense, unless expressively so defined herein.

While a few example embodiments have been described above, the scope of the disclosure is not limited thereto and various modifications and improvements made by those of ordinary skill in the art to concepts defined in the following claims and their equivalents should be understood to fall within the scope of the disclosure.

What is claimed is:

1. A method for initiating a time sensitive communication (TSC) service, performed by a terminal, the method comprising:
    transmitting, to a network node, request information for a TSC service, the request information comprising time parameters of the TSC service, and one or more of information indicating a transmission period of data in the TSC service, an arrival time of the data in the TSC service, and a TSC session requirement container, wherein the TSC session requirement container includes requirement information of the TSC service;
    receiving response information from the network node; and
    performing the TSC service based on the response information.

2. The method according to claim 1, wherein the time parameters comprise at least one of a start time of the TSC service, the transmission period of data in the TSC service, or a time precision requirement of the TSC service.

3. The method according to claim 2, wherein the response information comprises modified time parameter, and
    wherein the modified time parameters comprise at least one of a modified start time of the TSC service, a modified transmission period of data in the TSC service, or a modified time precision requirement of the TSC service.

4. The method according to claim 1, wherein the request information further comprises an identifier of the TSC service.

5. The method according to claim 1, wherein the requirement information of the TSC service is for a quality of service (QoS) flow.

6. The method according to claim 1, wherein the response information further comprises information indicating a port to be used for performing the TSC service in a service translator corresponding to the terminal, the port being determined at least based on the time parameters.

7. A terminal, comprising a processor and a memory,
the memory storing a computer program, the processor being configured to execute the computer program to perform the method according to claim 1.

8. A non-transitory computer-readable storage medium, storing computer instructions, the computer instructions, when executed by one or more processors, causing the method according to claim 1.

9. A terminal for initiating a time sensitive communication (TSC) service, the terminal comprising:
at least one memory configured to store program code; and
at least one processor configured to read the program code and operate as instructed by the program code, the program code comprising:
transmission code configured to cause the at least one processor to transmit, to a network node, request information for a TSC service, the request information comprising time parameters of the TSC service, and one or more of information indicating a transmission period of data in the TSC service, an arrival time of the data in the TSC service, and a TSC session requirement container, wherein the TSC session requirement container includes requirement information of the TSC service;
receiving code configured to cause the at least one processor to receive response information from the network node; and
processing code configured to cause the at least one processor to perform the TSC service based on the response information.

10. The terminal according to claim 9, wherein the time parameters comprise at least one of a start time of the TSC service, the transmission period of data in the TSC service, or a time precision requirement of the TSC service.

11. The terminal according to claim 10, wherein the response information comprising modified time parameters, and
wherein the modified time parameters comprise at least one of a modified start time of the TSC service, a modified transmission period of data in the TSC service, or a modified time precision requirement of the TSC service.

12. The terminal according to claim 9, wherein the request information further comprises an identifier of the TSC service.

13. The terminal according to claim 9, wherein the requirement information of the TSC service is for a quality of service (QoS) flow.

14. The terminal according to claim 9, wherein the response information further comprises information indicating a port to be used for performing the TSC service in a service translator corresponding to the terminal, the port being determined at least based on the time parameters.

15. A network node, comprising:
at least one memory configured to store program code; and
at least one processor configured to read the program code and operate as instructed by the program code, the program code comprising:
receiving code configured to cause the at least one processor to receive request information for a time sensitive communication (TSC) service from a terminal, the request information comprising time parameters of the TSC service, and one or more of information indicating a transmission period of data in the TSC service, an arrival time of the data in the TSC service, and a TSC session requirement container, the TSC session requirement container includes requirement information of the TSC service; and
transmission code configured to cause the at least one processor to transmit the request information to a network controller,
the receiving code being further configured to cause the at least one processor to receive response information from the network controller;
the transmission code being further configured to cause the at least one processor to transmit, to the terminal, the response information, based on which the TSC service is to be performed.

16. The network node according to claim 15, wherein the time parameters comprise at least one of a start time of the TSC service, the transmission period of data in the TSC service, or a time precision requirement of the TSC service.

17. The network node according to claim 16, wherein the response information comprising modified time parameters, and
wherein the modified time parameters comprise at least one of a modified start time of the TSC service, a modified transmission period of data in the TSC service, or a modified time precision requirement of the TSC service.

18. The network node according to claim 15, wherein the request information further comprises an identifier of the TSC service.

19. The network node according to claim 15, wherein the requirement information of the TSC service is for a quality of service (QoS) flow.

20. The network node according to claim 15, wherein the response information further comprises information indicating a port to be used for performing the TSC service in a service translator corresponding to the terminal, the port being determined at least based on the time parameters.

* * * * *